Feb. 27, 1945. W. M. SIESEL 2,370,201
METHOD OF MAKING ANCHOR NUTS
Filed Jan. 20, 1943
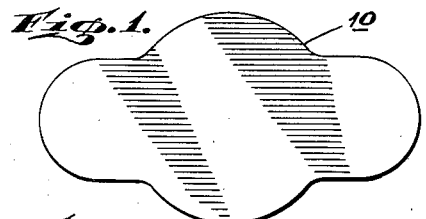
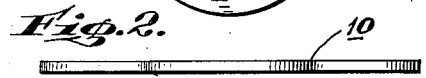
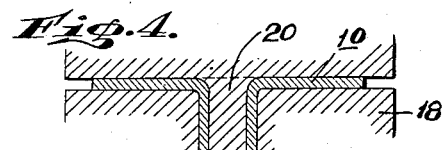
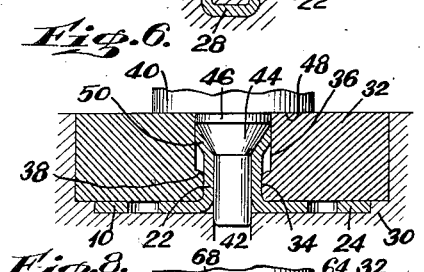
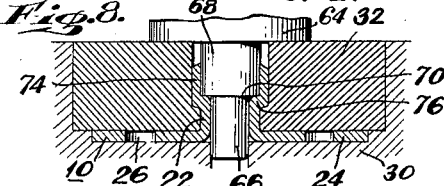
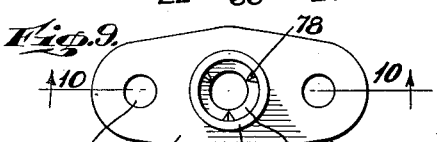
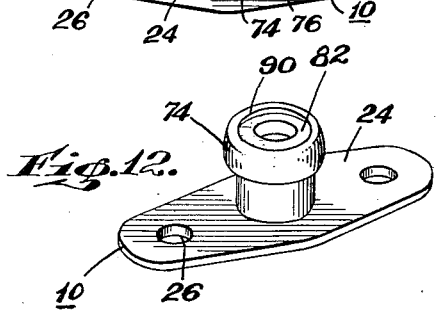
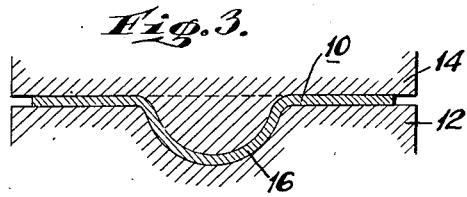
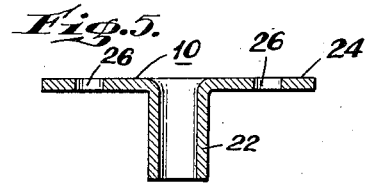
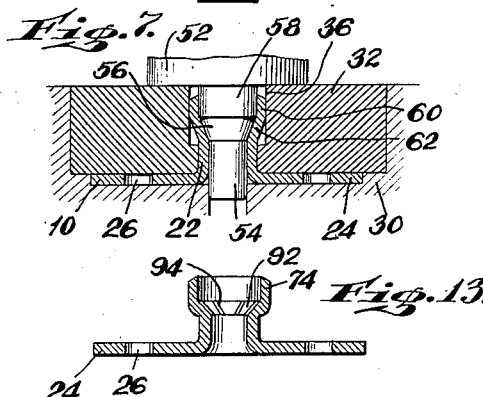
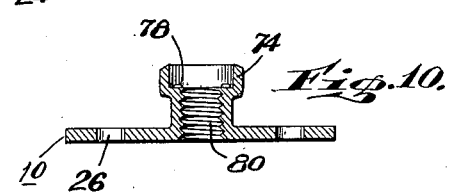
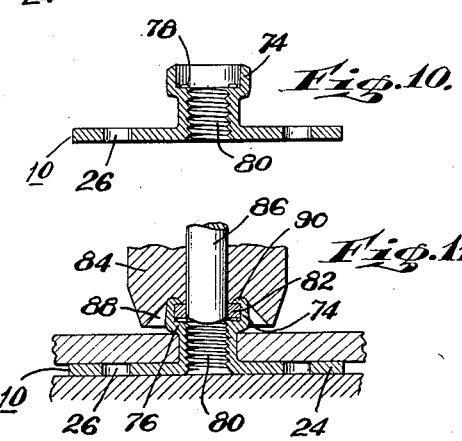
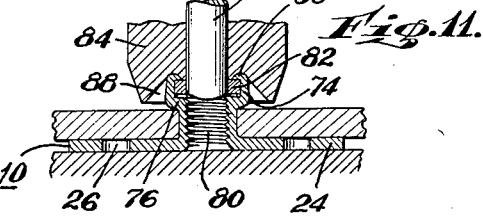
INVENTOR
William M. Siesel
BY
ATTORNEY Patented Feb. 27, 1945

2,370,201

UNITED STATES PATENT OFFICE 2,370,201

METHOD OF MAKING ANCHOR NUTS

William M. Siesel, Morrisville, Pa., assignor to Elastic Stop Nut Corporation, Union, N. J., a corporation of New Jersey Application January 20, 1943, Serial No. 472,961

6 Claims. (Cl. 10—86)

The present invention relates to improvements in methods of making anchor nuts and has particular reference to improvements in the manufacture of self-locking anchor nuts of the kind in which the locking action is secured by an insert assembled in the nut body.

Heretofore anchor nuts of the kind under consideration have been manufactured from bar stock by suitable automatic screw machine operations and also by cold heading operations.

For some applications it has been found desirable to make such nuts from sheet metal but the production from sheet metal of the form of nut blank required has not heretofore been successfully accomplished because of the extremely severe displacement and distortion of the sheet metal necessary to produce a blank providing the desired anchoring flange portion and the well or recess required to receive the locking insert.

It is therefore the general object of the present invention to provide a novel and improved method whereby anchor nuts of the desired kind may successfully be fabricated from sheet metal by stamping and drawing operations. A further object is to provide such a method which will permit of the operations being performed without intermediate annealing, with commercially available metals of the kind suitable for anchor nut structures.

Further objects and advantages of the invention will be apparent from the following description seen in connection with the accompanying drawing, which forms a part of this specification and of which;

Fig. 1 is a top view of a sheet metal blank;

Fig. 2 is a side view of the blank shown in Fig. 1;

Fig. 3 is a cross-sectional view of the blank shown in Figs. 1 and 2 within a suitable press which has performed a drawing operation thereon;

Fig. 4 is a view of the blank in place in another punch press which has performed a subsequent drawing operation;

Fig. 5 is a cross-sectional view of the blank shown in Fig. 4 after additional operations have been performed upon it;

Figs. 6, 7 and 8 are cross-sectional views of the member shown in Fig. 5 in place in a punch press which performed successive operations on the member;

Fig. 9 is a top view of the member after it has been removed from the press shown in Fig. 8;

Fig. 10 is a cross-sectional view of the member taken on the line 10—10 of Fig. 9 after it has been subjected to a tapping operation;

Fig. 11 is a cross-sectional view of the member shown in Fig. 10, in place within a press which has performed a further operation thereon;

Fig. 12 is a perspective view of a finished anchor nut; and

Fig. 13 is a view similar to Fig. 9 but showing a modification.

Referring to the drawing, reference character 10 designates a sheet metal blank which may have the configuration shown in Fig. 1. This blank is placed in a suitable punch press having a die 12, and a punch 14. When the punch descends it draws the blank 10 to form a circular projection 16 which in the example shown is more or less hemispherical in the central part thereof. The blank 10 is then subjected to one or more further deep drawing operations until it has been worked into the shape shown in Fig. 4. In this figure, the blank is shown in a press having a die 18 and a punch 20 which has formed a comparatively long hollow projection 22 at the center of the blank. It will be understood that there may be one or more intermediate drawings between those shown in Figs. 3 and 4.

The blank 10, after removal from the die shown in Fig. 4 includes a flange portion 24 and the cylindrical portion 22. The flange may be drilled or punched to provide apertures 26 by means of which the anchor nut may be riveted or otherwise suitably secured to one of the members which it is to fasten in place. As shown in Fig. 4, the cylindrical portion of the blank has a closed end 28. This end is cut off or otherwise removed so that the cylindrical portion or neck 22 is open at both ends as is shown in Fig. 5.

The member 10, in the form shown in Fig. 5, is then placed in punch press apparatus as shown in Fig. 6. This includes a bed plate 30 suitably recessed to receive the flange 24. A die 32 is then placed over the flange, this die being formed with a central bore. The lower portion 34 of the bore is of substantially the same diameter as the outer diameter of the neck 22 of the piece, whereas the upper portion 36 of the bore is of greater diameter, the two portions being connected by a shoulder 38. The punch 40 is formed with a pilot 42 of substantially the same diameter as the inner diameter of the cylindrical portion 22. Above the pilot the punch has a conical portion 44 extending to a cylindrical portion 46, the diameter of which is substantially equal to the diameter of the portion 36 in the die 32. The punch 40 is also formed with a shoulder 48 which seats against the top of the die 32 so as to limit the stroke of the punch. When the punch descends the conical portion 44 flares the upper end of the cylindrical portion 22 of the member 10, as is shown at 50.

The punch 40 is then withdrawn and a punch 52, shown in Fig. 7, is brought into place. This punch includes a pilot portion 54 of the same diameter as the pilot 42 of the punch 40. Above the pilot portions 54 is a conical portion 56, above which is a cylindrical portion 58 having a radius which is equal to the radius of the portion 36 of the bore, less the wall thickness of the portion 22 of the member 10. When the punch descends it alters the previously conical portion 50 of the member 10 to the cylindrical shape shown at 60 and, at the same time, forms an intermediate conical portion 62.

The punch 52 is then withdrawn and a punch 64, shown in Fig. 8, is brought into place. This punch has a pilot portion 66 of the same diameter as the pilot shown in Figs. 6 and 7. Above the pilot portion is a cylindrical portion 68 which is of the same diameter as the upper portion 58 of the punch shown in Fig. 7. Portions 66 and 68 are joined by an abrupt shoulder 70 in which are formed a plurality of triangular notches (not shown). When this punch descends it forces the previously conical portion 62 outwardly so as to form a cylindrical portion 74. The extension 22 of the member 10 now consists of two cylindrical parts of different diameters joined by a shoulder 76. Due to the provision of notches in the punch, a plurality of triangular projections 78, shown in Fig. 9, are formed on the shoulder.

The member 10 is now removed and the lower part of neck 22 is tapped to provide screw threads 80, as shown in Fig. 10. Thereafter, a locking washer 82 of suitable material is placed within the portion 74 of larger diameter and the member 10, with the washer thus in place, is placed in a press as shown in Fig. 11. The washer may be made of deformable fibrous material having an inner diameter intermediate the maximum and minimum diameter of the thread 80, or the washer may be made of elastic metal. The press includes a punch 84 having a pilot portion 86 and a conically recessed face 88. When the punch descends the pilot portion enters the aperture in the washer 82, so as to prevent the material of the washer from being displaced to reduce the size of this aperture. The conical face 88 of the punch turns the upper edge of the cylindrical portion 74 inwardly to form a lip 90 which bears against the upper surface of the washer and clamps it firmly against the shoulder 76. The projections 78 bite into the material of the washer so as to aid the axial compression in preventing the washer from rotating relative to the rest of the nut. The finished anchor nut is shown in perspective Fig. 12.

In Fig. 13 there is shown a slight modification, wherein the two cylindrical portions are joined by a conical portion 92, rather than by the abrupt shoulder 76. Triangular ridges 94 are preferably formed on the surface of the conical portion and serve the same purpose as do the projections 78.

It will thus be seen that the anchor nut is manufactured from sheet material by cold-working the metal in a series of drawing operations. This results in the grain structure of the metal being at all places parallel to the adjacent surface of the nut. Thus the grain structure in the flange 24 extends horizontally with the nut in position shown in Fig. 11, while the grain structure in the cylindrical portion extends vertically. At the juncture between the flange and the cylindrical portion the grain structure follows curved lines which are substantially parallel to the curvature of the metal at this point. Obviously, if the nut were turned out of bar stock, in which the grain structure extended lengthwise of the stock, it would necessarily extend at right angles to the surface of the flange 24. As it is well known, greater strength is obtained by having the grain structure parallel to the surface.

From an examination of Fig. 12 it will be clearly apparent how a nut manufactured in accordance with this invention results in the generation of much less scrap, than does a nut turned out of bar stock. The flange 24 extends laterally from each side of the cylindrical portion a distance substantially greater than the diameter of the cylindrical portion. This means that, if the nut were turned out of bar stock, it would be necessary to remove all the material above the flange and outside of the cylindrical portion, and it is evident that the scrap would amount to more metal than is left in the finished nut. Moreover, when manufacturing a nut from bar stock, it has been the practice to make the cylindrical portion with the same external diameter throughout. In other words, the part of the cylindrical portion adjacent to the flange has a greater wall thickness than does the rest of the cylindrical portion. This of course results in a greater weight of the nut. Inasmuch as literally thousands of such nuts are required in the manufacture of a large airplane, the saving of even a very small amount in the weight of each nut is important.

As will be seen from Fig. 1, the blank 10 is formed with bulges at the center so that, as a result of the deep drawing operations, the flange 24 obtains the final configuration shown in Fig. 12. Obviously, if desired, the blank could be of any shape, such as rectangular, and the flange trimmed to proper shape after it has been formed, and the flange may have other shapes than that shown. Furthermore, nuts may be formed from a continuous strip of material in an automatic machine, the partially completed nuts being moved from station to station for the performance of the successive operations. The sequence of the operations, whether carried out in an automatic machine or not, need not be exactly as described, but may be varied, as will be apparent to one skilled in the art.

It will be understood that the description given in the present application of nut and process of making it is for the purpose of illustration only and that the scope of the invention is not to be limited thereby, but is to be determined from the appended claims.

What is claimed is:

1. The method of making from sheet metal an anchor nut of the kind having a locking insert which includes the steps of initially bulging a sheet metal blank to form a projection having a substantial circular base of substantially larger diameter than the height of the projection, subsequently reducing the diameter of said projection (while maintaining at least substantially its initial height) to form a tubular projection having a bore suitable for threading with the thread for the intended nut, opening the outer end of said projection and thereafter expanding the previously contracted outer end portion of said projection to form an insert receiving well of substantially larger transverse dimension than the diameter of said thread receiving bore.

2. The method set forth in claim 1 in which the diameter of said initially formed projection is reduced until the height of the projection is substantially greater than its diameter.

3. The method set forth in claim 1 in which said steps are performed by a series of consecutive punch press operations.

4. The method set forth in claim 1 in which the formation of said well includes a punching operation by a punch inserted axially from the open end of the projection for causing flow of metal of the wall of the projection against a transversely extending surface on the punch to form a transverse annular seat at the base of the well for the reception of a locking insert.

5. In the manufacture of nuts of the kind in which an insert receiving recess or well is formed in a blank having an open ended neck formed by a tubular wall, that improvement which consists in supporting said neck in external dies relieved to provide an annular space around the outer end portion of said neck, forcing a punch having a tapered section axially into the open and unsupported end of said neck to expand the same and thereby form two neck portions of different diameter joined by a conical portion and forcing a punch having a transversely extending face axially into said expanded portion to force said conical portion outwardly and flow the material thereof against said face, whereby to form at the outer part of said neck a cylindrical well having a transversely extending seat.

6. In the manufacture of nuts of the kind in which an insert receiving recess or well is formed in a blank having an open ended neck formed by a tubular wall, that improvement which consists in supporting said neck in external dies relieved to provide an annular space around the outer end portion of said neck, forcing a punch having a tapered section axially into the open and unsupported end of said neck to expand the same and thereby form two neck portions of different diameter joined by a conical portion and forcing a punch having a transversely extending face provided with a plurality of notches at its periphery axially into said expanded portion to force said conical portion outwardly and flow the material thereof against said face and into said notches, whereby to form at the outer part of said neck a cylindrical well having a transversely extending seat provided with insert engaging projections at its periphery.

WILLIAM M. SIESEL.